(12) United States Patent
So et al.

(10) Patent No.: US 11,537,546 B2
(45) Date of Patent: Dec. 27, 2022

(54) CONCURRENT COMMUNICATIONS VIA A CONNECTOR

(71) Applicant: HEWLETT-PACKARD DEVELOPMENT COMPANY, L.P., Houston, TX (US)

(72) Inventors: Chi So, Houston, TX (US); Nam H. Nguyen, Houston, TX (US); Ronald E. Deluga, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1027 days.

(21) Appl. No.: 16/078,381

(22) PCT Filed: Aug. 22, 2016

(86) PCT No.: PCT/US2016/048046
§ 371 (c)(1),
(2) Date: Aug. 21, 2018

(87) PCT Pub. No.: WO2018/038705
PCT Pub. Date: Mar. 1, 2018

(65) Prior Publication Data
US 2021/0191896 A1      Jun. 24, 2021

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0042* (2013.01)

(58) Field of Classification Search
CPC .................................................... G06F 12/00
See application file for complete search history.

(56) References Cited

U.S. PATENT DOCUMENTS

| 5,502,621 A | * | 3/1996 | Schumacher | ........... H01L 23/50 |
| | | | | 361/760 |
| 7,590,797 B2 | * | 9/2009 | Janzen | ................ G06F 13/1684 |
| | | | | 711/103 |
| 8,599,595 B1 | * | 12/2013 | Stephens, Jr. | ..... G11C 11/40615 |
| | | | | 365/51 |
| 9,047,257 B2 | | 6/2015 | Aravindhan | |

(Continued)

FOREIGN PATENT DOCUMENTS

| CN | 101308481 A | 11/2008 |
| CN | 104737141 A | 6/2015 |
| EP | 2706625 A1 | 3/2014 |

OTHER PUBLICATIONS

"How Multiple USB Devices Connect to Host Devices-USB Connectivity Schematics", Retrieved from internet—http://www.apc.com/us/en/faqs/FA158589/, 2016, 3 Pages.

*Primary Examiner* — Henry Tsai
*Assistant Examiner* — Juanito C Borromeo
(74) *Attorney, Agent, or Firm* — Quarles & Brady LLP

(57) ABSTRACT

An example electronic device includes a controller and a connector coupled to the controller. The connector includes a first set of pins and a second set of pins. The controller concurrently is to communicate with a first module of a modular computing system via the first set of pins and to communicate with a second module of the modular computing system, coupled to the first module, via the second set of pins.

20 Claims, 4 Drawing Sheets

(56) References Cited

U.S. PATENT DOCUMENTS

| | | |
|---|---|---|
| 9,237,217 B2 | 1/2016 | Zeung et al. |
| 2003/0100198 A1 | 5/2003 | Hicks et al. |
| 2007/0245057 A1 | 10/2007 | Bohm et al. |
| 2008/0256283 A1 | 10/2008 | Chiu et al. |
| 2010/0126005 A1 | 5/2010 | He et al. |
| 2011/0126005 A1 | 5/2011 | Carpenter et al. |
| 2011/0179201 A1 | 7/2011 | Monks et al. |
| 2012/0084470 A1 | 4/2012 | Antwerpen et al. |
| 2016/0112711 A1* | 4/2016 | Hundal ............... G06F 13/4282 375/240.26 |
| 2016/0139640 A1 | 5/2016 | Hijazi et al. |
| 2017/0242804 A1* | 8/2017 | Voor ................... G06F 13/4282 |

\* cited by examiner

CONCURRENT COMMUNICATIONS VIA A CONNECTOR

BACKGROUND

A computing device, such as a desktop computer, may include a plurality of connectors so that the computing device may be connected to other electronic devices, such as a speaker and a display, for increased functionality.

BRIEF DESCRIPTION OF THE DRAWINGS

Some examples of the present application are described with respect to the following figures.

DETAILED DESCRIPTION

In a modular computing system where different functions (e.g., storage, media output, etc.) of the system are connected together using external modules, a connector implementing the universal serial bus (USB) protocol may be used. However, industry standard USB connectors may have limited bandwidth and may lack upgradability.

Examples described herein provide a connector to connect different modules of a modular computing system. For example, a computing device may include a controller and a connector coupled to the controller. The connector may include a first set of pins and a second set of pins. The controller may concurrently communicate with a first module of a modular computing system via the first set of pins and communicate with a second module of the modular computing system, coupled to the first module, via the second set of pins. In this manner, examples described herein may increase available bandwidth as compared to an industry standard USB connector and may provide a modular computing system with greater upgradability.

Figure 1:
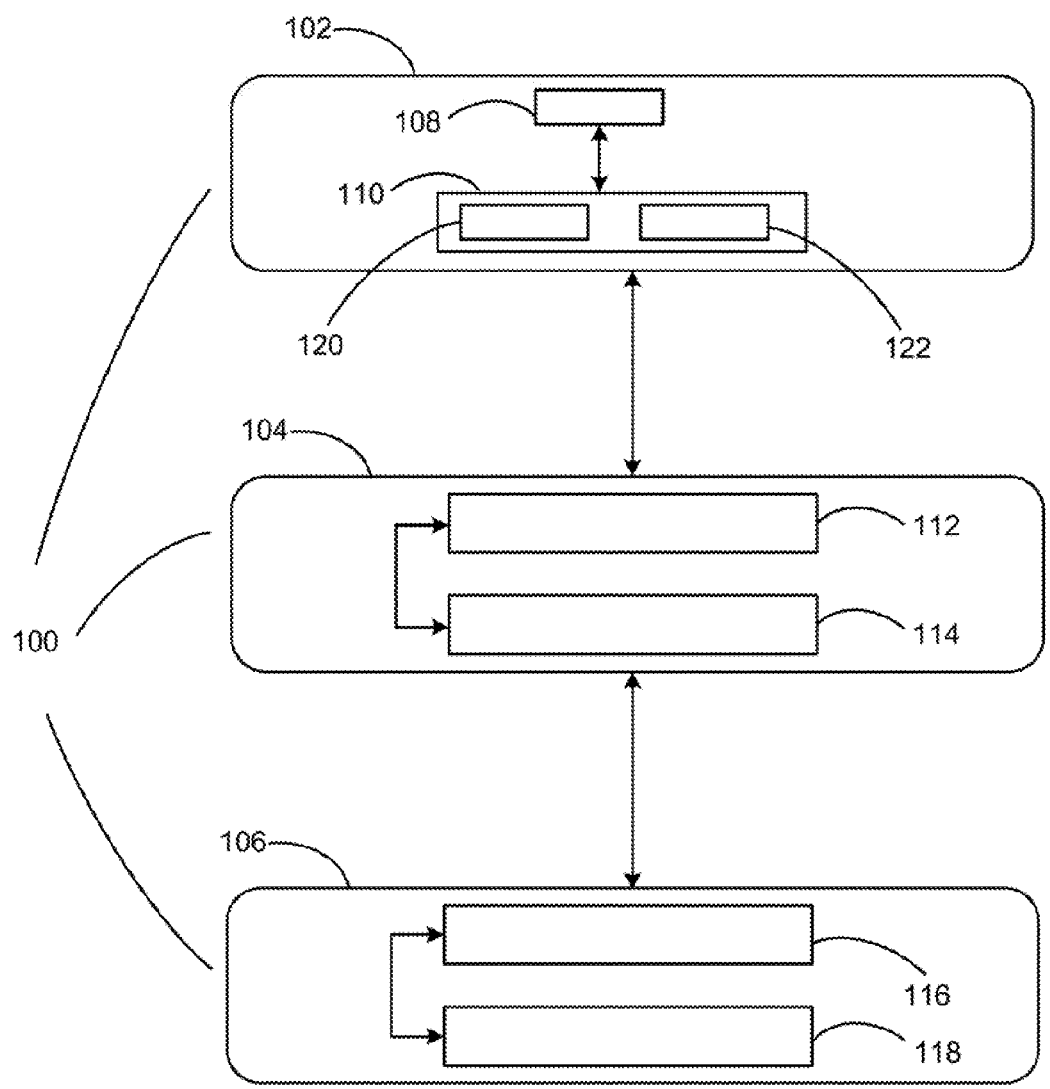
FIG. 1 illustrates a modular computing system where a module concurrently communicates with other modules of the modular computing system via two sets of pins of a connector of the module, according to an example.

FIG. 1 illustrates a modular computing system 100 where a module concurrently communicates with other modules of the modular computing system via two sets of pins of a connector of the module, according to an example. Modular computing system 100 may include a plurality of electronic devices as modules. For example, modular computing system 100 may include a computing module 102. Computing module 102 may be implemented as a computing device to control functions of modular computing system 100. Modular computing system 100 may also include at least one peripheral module to provide additional function to modular computing system 100. For example, modular computing system 100 may also include a first module 104 and a second module 106.

Computing module 102 may include a controller 108 and a connector 110. Controller 108 may control operations of connector 110 and/or computing module 102. Connector 110 may be implemented as a plug or a receptacle. Connector 110 may include a plurality of pins to communicate with modules 104 and 106. Modules 104 and 106 may include connectors similar to connector 116 for communication. For example, first module 104 may include connectors 112 and 114. Second module 106 may include connectors 116 and 118. Using connectors 110-118, modules 102-106 may be stacked vertically to form modular computing system 100.

During operation, computing module 102 may use connector 110 to communicate with modules 104 and 106. First module 104 may be physically connected to connector 110 of computing module 102 via connector 112. First module 104 may be physically connected to connector 116 of second module 106 via connector 114. Thus, second module 106 may be electrically connected to computing module 102 via first module 104.

Computing module 102 may perform a discovery operation to determine the number of modules connected to computing module 102. For example, computing module 102 may transmit a message via connector 110 to connected modules. In response to the message, modules 104 and 106 may each respond with information regarding the type of the respective module (e.g., the functionality of each respective module) and modules physically connected to the respective module.

Based on the responses from modules 104 and 106, computing module 102 may determine a stacking order of modules 104 and 106 relative computing module 102. Computing module 102 may also determine a respective type of modules 104 and 106. The stacking order may indicate that first module 104 is physically connected to computing module 102 and second module 106 is physically connected to first module 104.

Based on the determined respective type of modules 104 and 106, computing module 102 may also determine a communication protocol to communicate with modules 104 and 106. The communication protocol may be any protocol compatible with a USB type-C connector, such as a USB 3.0 protocol, a USB 3.1 protocol, a Thunderbolt protocol, a DisplayPort protocol, etc.

In some examples, computing module 102 may use the USB protocol to communicate with connected modules that are not a graphics module (e.g., a device that provides graphic processing, such as frame rendering). When a graphics module (e.g., a device that provides graphic processing, such as frame rendering) is connected to computing module 102, computing module 102 may communicate to the graphics module using the Thunderbolt protocol. Computing module 102 may also configure pins of connector 110 to implement the determined protocol.

In an example, modules 104 and 106 may be non-graphics modules. First module 104 may provide data storage to modular computing system 100. Second module 106 may provide sound output (e.g., a speaker) to modular computing system 100. Computing module 102 may communicate to modules 104 and 106 concurrently via connector 110.

Computing module 102 may communicate with modules 104 and 106 via the USB protocol. In an example, computing module 102 may configure pins of connector 110 into two sets of pins: a first set of pins 120 and a second set of pins 122. Computing module 102 may implement a first communication channel compatible with a USB 3.0 protocol using first set of pins 120. Computing module 102 may implement a second communication channel compatible with the USB 3.0 protocol using second set of pins 122. Thus, computing module 102 may use two concurrent USB 3.0 channels to communicate with connected modules.

Computing module 102 may communicate with first module 104 via first set of pins 120 and communicate with second module 106 via second set of pins 122. First module 104 may receive both communications via corresponding pins of connector 112. First module 104 may process data destined for first module 104 (e.g., data communicated via first set of pins 120). First module 104 may route data destined for second module 106 (e.g., data communicated via second set of pins 122) via connector 114. When first module 104 receives data destined for computing module 102 from second module 106. First module 104 may re-transmit the data to computing module. Communications using connectors 112-118 may be implemented in a similar manner as connector 110 described above.

In some examples, when there are more than two modules connected to computing module 102, computing module 102 may determine which of the modules are odd modules (e.g., first module 104) and which of the modules are even modules (e.g., second module 106) based on the stacking order. Computing module 102 may communicate with the odd modules via first set of pins 120 and communicate with the even modules via second set of pins 122.

In an example, first module 104 may be a graphics module and second module 106 may be a non-graphics module. Computing module 102 may configure the pins of connector 110 to implement a Thunderbolt protocol. Computing module 102 may transmit data destined for first module 104 and data destined for second module 106 via connector 110 using the Thunderbolt protocol. When first module 104 receives the data via connector 114, first module 104 may identify the data destined for first module 104 and the data destined for second module 106. For example, first module 104 may examine header(s) in the data to make the destination determination. First module 104 may convert the data destined for second module 106 from the Thunderbolt format to the USB format. First module 104 may transmit the data to second module 106 via connector 114 using the USB protocol. When first module 104 receives data from second module 106 that is destined for computing module 102. First module 104 may convert the data from the USB format to the Thunderbolt format. First module 104 may transmit the data to computing module 102 using the Thunderbolt protocol.

Figure 2A:
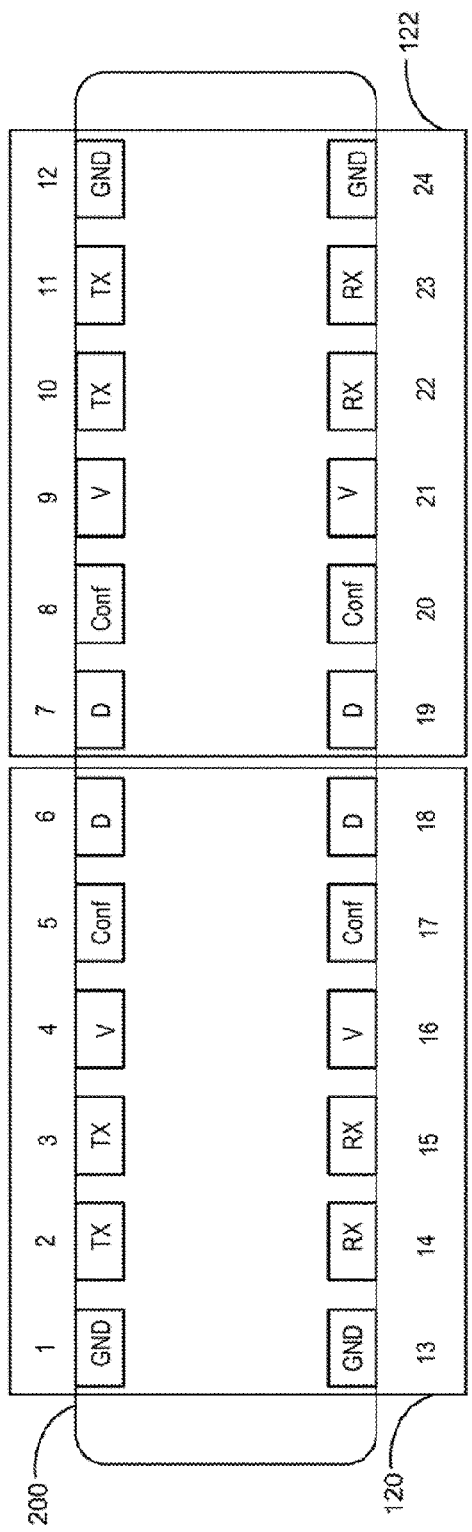
FIG. 2A illustrates a pin assignment of a connector implementing two concurrent universal serial bus (USB) 3.0 compatible channels, according to an example.

FIG. 2A illustrates a pin assignment of a connector 200 implementing two concurrent universal serial bus (USB) 3.0 compatible channels, according to an example. Connector 200 may implement connectors 110, 112, 114, 116, and/or 118 of FIG. 1. In an example, connector 200 may include 24 pins. Pins 1-6 and 13-18 may be implemented as first set of pins 120. Pins 7-12 and 19-24 may be implemented as second set of pins 122.

To implement two concurrent USB 3.0 channels, first set of pins 120 and second set of pins 122 may have identical but mirrored pin assignments. For example, in first set of pins 120, pins 1 and 13 may be configured as ground. Pins 2-3 and 14-15 may be configured as two "SuperSpeed" differential pairs for USB 3.0 or above (e.g. USB 3.1). Pins 4 and 16 may be configured as bus power. Pins 5 and 17 may be configured for sideband communication (e.g., BIOS upgrade of modules using the I²C protocol) and/or for USB channel configuration. Pins 6 and 18 may be configured as a high speed differential pair for USB 2.0 communication.

In second set of pins 122, pins 12 and 24 may be configured as ground. Pins 10-11 and 22-23 may be configured as two "SuperSpeed" differential pairs for USB 3.0 or above (e.g. USB 3.1). Pins 9 and 21 may be configured as bus power. Pins 8 and 20 may be configured for sideband communication (e.g., BIOS upgrade of modules using the I²C protocol) and/or for USB channel configuration. Pins 7 and 19 may be configured as a high speed differential pair for USB 2.0 communication.

Figure 2B:
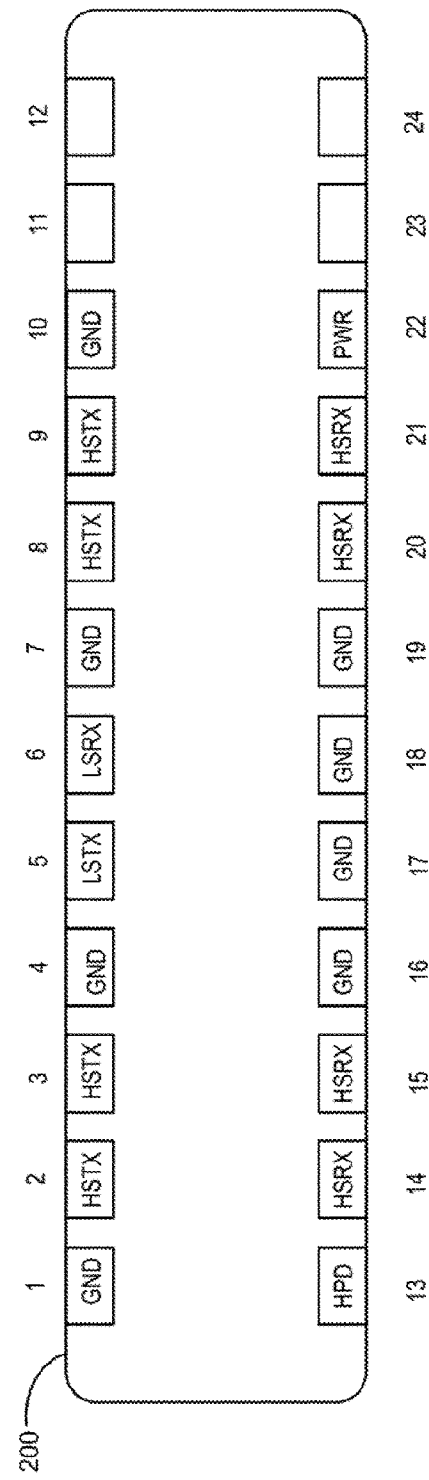
FIG. 2B illustrates a pin assignment of the connector implementing the Thunderbolt protocol, according to an example.

FIG. 2B illustrates a pin assignment of connector 200 implementing the Thunderbolt protocol, according to an example. Pins 1, 4, 7, 10, 16, 18, and 19 may be configured as ground. Pins 2, 3, 8, 9, 14, 15, 20 and 21 may be configured as two high speed transmit/receive pairs. Pins 5 and 6 may be configured as low speed transmit/receive. Pin 22 may be configured as power.

Figure 3:
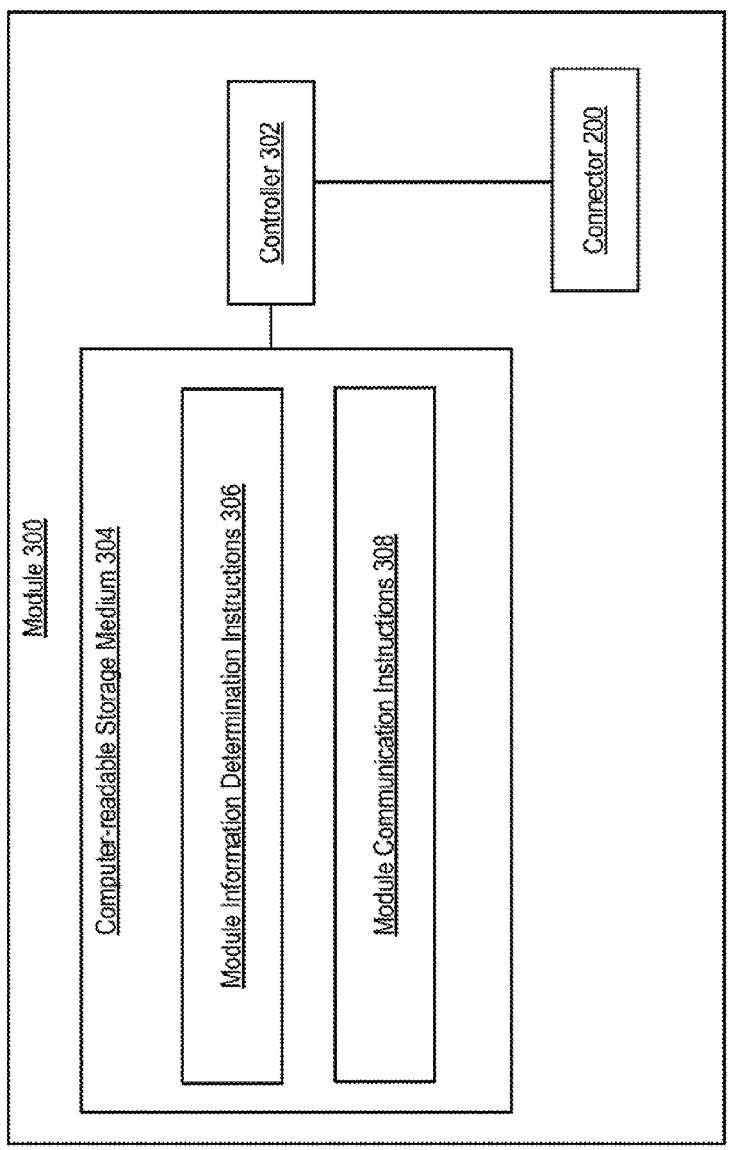
FIG. 3 illustrates a module of a modular computing system that uses a connector to concurrently communicate with other modules of the modular computing system via two sets of pins, according to another example.

FIG. 3 illustrates a module 300 of a modular computing system that uses a connector to concurrently communicate with other modules of the modular computing system via two sets of pins, according to another example. Module 300 may implement computing module 102, first module 104, and/or second module 106 of FIG. 1.

Module 300 may include a controller 302, a computer-readable storage medium 304, and connector 200 of FIG. 2. Controller 302 may be a central processing unit (CPU), a semiconductor-based microprocessor, and/or other hardware devices suitable for retrieval and execution of instructions stored in computer-readable storage medium 304.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. Computer-readable storage medium 304 may be encoded with a series of processor executable instructions 306 and 308.

Module information determination instructions 306 may determine a stacking order of modules connected to module 300 to form a stacked modular computing system. The stacking order may indicate the order in which each module is connected relative to module 300. The stacking order may also indicate which of the connected modules are odd modules and which of the connected modules are even modules relative to module 300. For example, referring to FIG. 1, based on the responses from modules 104 and 106, computing module 102 may determine a stacking order associated with modules 104 and 106 relative to computing module 102. The stacking order may indicate that first module 104 is physically connected to computing module 102 and second module 106 is physically connected to first module 104. The stacking order may also indicate which of the connected modules are odd modules and which of the connected modules are even modules.

Module communication instructions 308 may determine a protocol to be used to communicate with modules of a modular computing system. For example, referring to FIG. 1, based on the responses received from modules, computing module 102 may also determine a protocol to communicate with modules 104 and 106. Module communication instructions 308 may also configure pins of connector 200 to implement the determined protocol. For example, referring to FIG. 1, computing module 102 may configure pins of connector 110 to implement the determined protocol.

Figure 4:
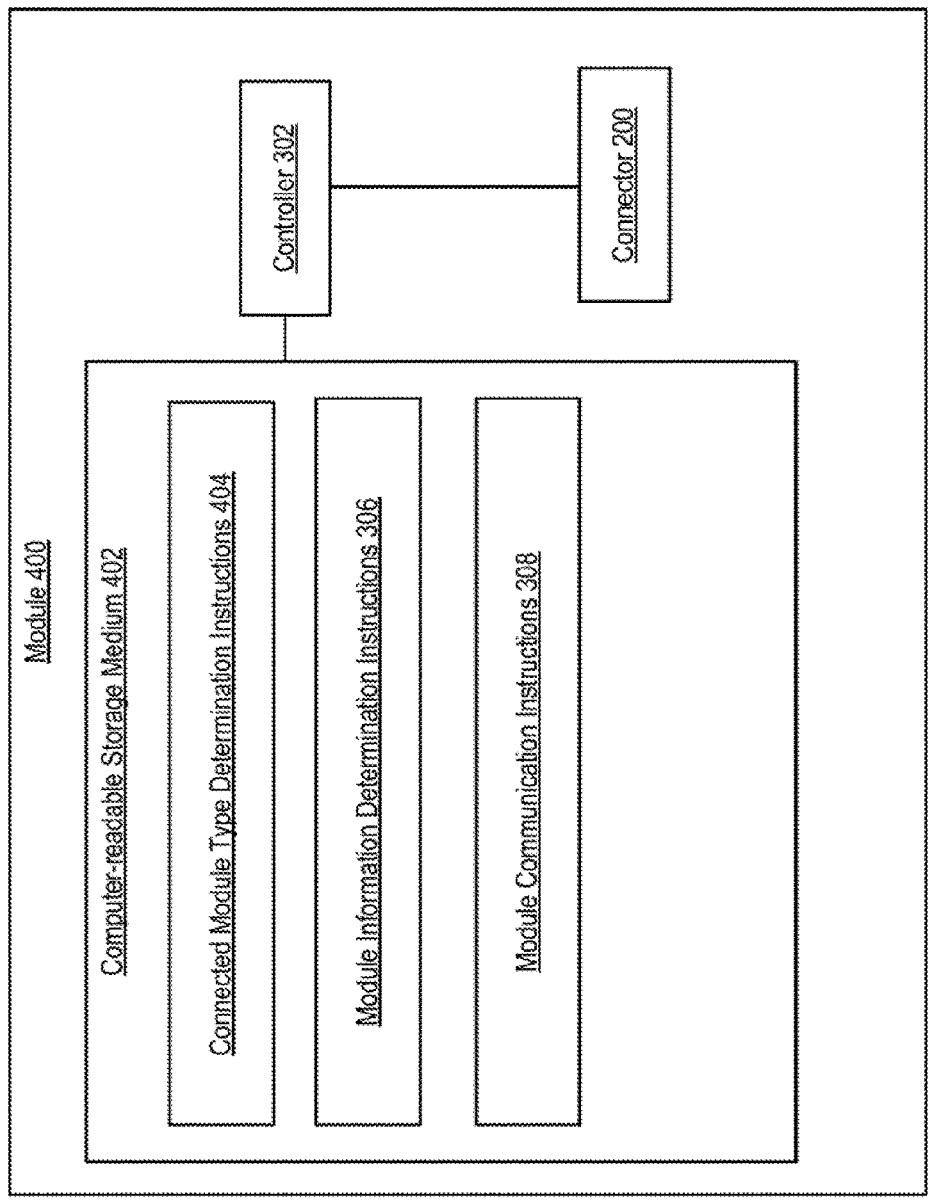
FIG. 4 illustrates a module of a modular computing system that uses a connector to concurrently communicate with other modules of the modular computing system via two sets of pins, according to another example.

FIG. 4 illustrates a module 400 of a modular computing system that uses a connector to concurrently communicate with other modules of the modular computing system via two sets of pins, according to another example. Module 400 may implement module 300 of FIG. 3, computing module 102, first module 104, and/or second module 106 of FIG. 1. Module 400 may include controller 302, a computer-readable storage medium 402, and connector 200. Computer-readable storage medium 402 may be similar to computer-readable storage medium 304. Computer-readable storage medium 402 may be encoded with instructions 404, 306, and 308.

Connected module type determination instructions 404 may determine a respective type of modules connected to module 400. For example, referring to FIG. 1, computing module 102 may also determine a respective type of modules 104 and 106.

The use of "comprising", "including" or "having" are synonymous and variations thereof herein are meant to be inclusive or open-ended and do not exclude additional unrecited elements or method steps.

What is claimed is:

1. An electronic device comprising:
    a controller; and
    a connector coupled to the controller, wherein the connector includes a first set of pins and a second set of pins different from the first set of pins, and wherein the controller concurrently is to:
        communicate, over the first set of pins, with a first module of a modular computing system; and
        communicate, over the second set of pins, with a second module of the modular computing system, wherein the first module is connected between the second module and the connector, and wherein the controller is to communicate data with the second module in which the data is passed through the first module.

2. The electronic device of claim 1, where the first set of pins is to implement a first communication channel compatible with a universal serial bus (USB) 3.0 protocol, and wherein the second set of pins is to implement a second communication channel compatible with the USB 3.0 protocol.

3. The electronic device of claim 1, wherein the first set of pins and the second set of pins are to implement a Thunderbolt protocol.

4. The electronic device of claim 1, wherein the first set of pins and the second set of pins have mirrored pin assignments.

5. The electronic device of claim 1, wherein the first set of pins and the second set of pins have identical pin assignments.

6. An electronic device comprising:
    a controller; and
    a connector coupled to the controller, wherein the connector includes a first set of pins and a second set of pins different from the first set of pins, and wherein the controller is to concurrently:
        communicate with a first module of a modular computing system using the first set of pins; and
        communicate with a second module of the modular computing system, using the second set of pins, wherein the second module is coupled to the first module, and
    wherein the first set of pins in the connector includes a same collection of power, ground, and signal pins as the second set of pins in the connector.

7. The electronic device of claim 6, wherein the controller is to communicate with the first module according to a communication protocol, and communicate with the second module according to the communication protocol, and wherein the communication protocol is compatible with a universal serial bus (USB) 3.0 protocol.

8. The electronic device of claim 6, wherein the collection of power, ground, and signal pins of the first set of pins is mirrored from the collection of power, ground, and signal pins of the second set of pins.

9. The electronic device of claim 8, wherein the first set of pins and the second set of pins have identical pin assignments.

10. The electronic device of claim 7, wherein the controller is to determine the communication protocol based on a type of the first module and a type of the second module, and wherein the communication protocol is compatible with a USB type-C connector.

11. The electronic device of claim 10, wherein the controller is to use a Thunderbolt protocol with a graphics module, and wherein the controller is to use the USB 3.0 protocol with a non-graphics module.

12. A non-transitory computer-readable storage medium comprising instructions that when executed cause a controller of an electronic device to:
    determine information associated with a first module of a modular computing system and a second module of the modular computing system relative to the electronic device;
    communicate with the first module via a first set of pins of a connector of the electronic device based on the information; and
    communicate with the second module via a second set of pins of the connector based on the information, wherein the communication with the first module and the communication with the second module are concurrent, the second set of pins is different from the first set of pins, the first module is connected between the second module and the connector, and the controller is to communicate data with the second module in which the data is passed through the first module.

13. The non-transitory computer-readable storage medium of claim 12, wherein the second module is physically connected to the first module via a connector of the first module.

14. The non-transitory computer-readable storage medium of claim 12, wherein the information includes a stacking order associated with the first module and the second module, wherein the stacking order indicates whether a module is an odd module or an even module, and wherein the information further includes a respective type of the first module and the second module.

15. The non-transitory computer-readable storage medium of claim 14, wherein the instructions when executed further cause the controller to:
    communicate with the odd module via the first set of pins; and
    communicate with the even module via the second set of pins.

16. The electronic device of claim 1, wherein one of the first module and the second module is a graphics module, and another one of the first module and the second module is a non-graphics module.

17. The electronic device of claim 1, wherein one of the first module and the second module includes a first peripheral functionality, and another one of the first module and the second module includes a second peripheral functionality different from the first peripheral functionality.

18. The electronic device of claim 17, wherein the first peripheral functionality is a data storage functionality to store data, and the second peripheral functionality is an audio output functionality to output audio.

19. The electronic device of claim 1, wherein the controller is to communicate the data with the second module that has a connector connected to a connector of the first module, and the first module has a connector connected to the first set of pins of the connector of the electronic device.

20. The non-transitory computer-readable storage medium of claim 6, wherein one of the first module and the second module is a graphics module, and another one of the first module and the second module is a non-graphics module.

* * * * *